(12) United States Patent
Sonnenfeldt et al.

(10) Patent No.: US 8,760,487 B2
(45) Date of Patent: *Jun. 24, 2014

(54) APPARATUS AND METHOD TO BRIDGE TELEPHONE AND DATA NETWORKS

(75) Inventors: Stewart H. Sonnenfeldt, Burlingame, CA (US); Venkatram R. Kuditipudi, Los Altos, CA (US); Arno Penzias, San Francisco, CA (US); Subrah S. Iyar, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 737 days.

This patent is subject to a terminal disclaimer.

(21) Appl. No.: 12/903,141

(22) Filed: Oct. 12, 2010

(65) Prior Publication Data

US 2011/0026693 A1 Feb. 3, 2011

Related U.S. Application Data

(62) Division of application No. 10/699,103, filed on Nov. 3, 2003, now Pat. No. 7,814,150.

(60) Provisional application No. 60/475,471, filed on Jun. 3, 2003.

(51) Int. Cl.
*H04N 7/14* (2006.01)

(52) U.S. Cl.
USPC ..................... 348/14.01; 379/93.01

(58) Field of Classification Search
USPC ......... 370/260; 379/93.06, 244; 709/204–206
See application file for complete search history.

(56) References Cited

U.S. PATENT DOCUMENTS

| | | | | |
|---|---|---|---|---|
| 4,079,196 A | * | 3/1978 | Spanel | 379/448 |
| 4,546,212 A | * | 10/1985 | Crowder, Sr. | 370/488 |
| 4,691,347 A | | 9/1987 | Stanley et al. | |
| 5,373,549 A | | 12/1994 | Bales et al. | |
| 5,414,750 A | | 5/1995 | Bhagat et al. | |
| 5,455,859 A | * | 10/1995 | Gutzmer | 379/442 |
| 5,764,277 A | | 6/1998 | Loui et al. | |
| 5,812,552 A | | 9/1998 | Arora et al. | |
| 5,838,665 A | * | 11/1998 | Kahn et al. | 370/260 |
| 5,917,807 A | * | 6/1999 | Lee et al. | 370/251 |
| 5,990,933 A | | 11/1999 | Ozone et al. | |
| 5,995,608 A | | 11/1999 | Detampel et al. | |
| 6,094,213 A | | 7/2000 | Mun et al. | |
| 6,151,621 A | | 11/2000 | Colyer et al. | |
| 6,175,565 B1 | | 1/2001 | McKinnon et al. | |
| 6,237,026 B1 | | 5/2001 | Prasad et al. | |
| 6,304,648 B1 | | 10/2001 | Chang | |
| 6,345,047 B1 | | 2/2002 | Regnier | |
| 6,346,962 B1 | | 2/2002 | Goodridge | |
| 6,418,214 B1 | | 7/2002 | Smythe et al. | |
| 6,501,740 B1 | | 12/2002 | Sun et al. | |

(Continued)

*Primary Examiner* — Maria El-Zoobi

(57) ABSTRACT

In one embodiment, an adaptor includes a first interface configured to connect to a telephone handset and configured to receive signals from, and transmit signals to, the telephone handset. The adaptor includes a second interface configured to connect to a telephone base and configured to receive signals from, and transmit signals to, a telephone network. The adaptor also includes a third interface configured to connect to a computer and to receive signals from, and transmit signals to, a data network, via the computer. The adaptor also includes a user input mechanism configured to receive a start meeting command which causes the adaptor to initiate an online meeting between a user that utilizes the telephone handset and computer, and one or more other users.

20 Claims, 6 Drawing Sheets

(56) References Cited

U.S. PATENT DOCUMENTS

| | | |
|---|---|---|
| 6,542,586 B1 | 4/2003 | Helstab |
| 6,600,815 B1 * | 7/2003 | Walding .................... 379/93.07 |
| 6,601,087 B1 | 7/2003 | Zhu et al. |
| 6,654,032 B1 | 11/2003 | Zhu et al. |
| 6,697,464 B1 * | 2/2004 | Nelson et al. ............. 379/93.05 |
| 6,747,970 B1 | 6/2004 | Lamb et al. |
| 6,757,379 B1 * | 6/2004 | Lane ....................... 379/387.01 |
| 6,760,749 B1 | 7/2004 | Dunlap et al. |
| 6,763,226 B1 | 7/2004 | McZeal, Jr. |
| 6,826,174 B1 * | 11/2004 | Erekson et al. .............. 370/352 |
| 6,826,301 B2 | 11/2004 | Glickman |
| 6,853,716 B1 | 2/2005 | Shaffer et al. |
| 6,959,072 B1 | 10/2005 | Lee |
| 7,006,455 B1 | 2/2006 | Fandrianto et al. |
| 7,031,454 B1 | 4/2006 | Steiman |
| 7,099,448 B1 | 8/2006 | Laniepce et al. |
| 7,111,056 B1 | 9/2006 | Ramey et al. |
| 7,213,051 B2 * | 5/2007 | Zhu et al. ..................... 709/205 |
| 7,234,116 B2 | 6/2007 | Watanabe et al. |
| 7,313,592 B1 | 12/2007 | Huboi et al. |
| 7,321,867 B1 | 1/2008 | Uchida et al. |
| 7,411,939 B1 | 8/2008 | Lamb et al. |
| 7,421,469 B1 | 9/2008 | Liu et al. |
| 7,463,619 B1 | 12/2008 | Prokop et al. |
| 7,613,824 B1 | 11/2009 | Elberse et al. |
| 7,814,150 B1 * | 10/2010 | Sonnenfeldt et al. ......... 709/204 |
| 8,090,082 B2 * | 1/2012 | Gilbert et al. .............. 379/88.14 |
| 8,259,906 B2 * | 9/2012 | Knudson et al. ................. 379/21 |
| 2002/0103864 A1 * | 8/2002 | Rodman et al. ............... 709/204 |
| 2003/0035527 A1 | 2/2003 | Baker |
| 2003/0072429 A1 | 4/2003 | Slobodin et al. |
| 2003/0140121 A1 | 7/2003 | Adams |
| 2003/0142635 A1 | 7/2003 | Roher et al. |
| 2003/0152207 A1 | 8/2003 | Ryan |
| 2004/0085913 A1 | 5/2004 | Baxley et al. |
| 2004/0101119 A1 | 5/2004 | Malcolm et al. |
| 2004/0190691 A1 | 9/2004 | Schoeman |
| 2004/0199580 A1 | 10/2004 | Zhakov et al. |
| 2005/0008240 A1 | 1/2005 | Banerji et al. |
| 2005/0286444 A1 | 12/2005 | Yang et al. |
| 2005/0289471 A1 | 12/2005 | Thompson et al. |
| 2006/0002543 A1 * | 1/2006 | Newland ....................... 379/368 |
| 2006/0006230 A1 | 1/2006 | Bear et al. |
| 2006/0067513 A1 * | 3/2006 | Maytal et al. .................. 379/395 |
| 2006/0222155 A1 | 10/2006 | Summers et al. |
| 2007/0192410 A1 | 8/2007 | Liversidge et al. |
| 2007/0192476 A1 | 8/2007 | Watanabe et al. |
| 2008/0279177 A1 * | 11/2008 | Shlomot ....................... 370/352 |
| 2010/0189098 A1 * | 7/2010 | Binder ......................... 370/352 |

* cited by examiner

APPARATUS AND METHOD TO BRIDGE TELEPHONE AND DATA NETWORKS

CROSS-REFERENCE TO RELATED APPLICATIONS

The present application is a divisional of copending U.S. patent application Ser. No. 10/699,103, filed Nov. 3, 2003, entitled "Apparatus and Method to Bridge Telephone and Data Networks", by inventors Stewart H. Sonnenfeldt, Venkatram R. Kuditipudi, Arno Penzias, and Subrah S. Iyar, which is hereby incorporated by reference.

U.S. patent application Ser. No. 10/699,103 claims the benefit of Provisional Patent Application Ser. No. 60/475,471, filed Jun. 3, 2003, entitled "Apparatus and Method to Bridge Telephone and Data Networks", by inventors Stewart H. Sonnenfeldt, Venkatram R. Kuditipudi, Arno Penzias, and Subrah S. Iyar, the disclosure of which is also hereby incorporated by reference.

BACKGROUND OF THE INVENTION

1. Field of the Invention

The present invention relates generally to communications technology.

2. Description of the Background Art

Various systems and services are now being offered to allow two or more users to participate in an online, collaborative meeting, in which the users may share and collectively review or edit applications, files, documents, and images. Video may be available or supported for these meetings. One such service is provided by WebEx Communications, Inc., of San Jose, Calif. For example, the online meetings may be initiated through a website, and attendees may be invited to join via electronic mail (email). After joining such an online meeting using a web browser on their personal computers (PCs), the attendees may dial into a conference call for reliable audio.

SUMMARY

In accordance with one embodiment, the invention pertains to a method for initiating an online meeting over a data network between a host party with a first computer and an attendee party with a second computer. Consider that a phone connection already exists over a telephone network between a first phone of the host party and a second phone of the attendee party. A start meeting message is sent over the data network to a data center. A meeting identification is subsequently received from the data center. The meeting identification is stored in a first device that is coupled to both the first phone and the first computer, and the meeting identification is transmitted from the first device over the telephone network to a second device, where the second device is coupled to both the second phone and the second computer.

In accordance with another embodiment, the invention pertains to an apparatus is including first, second, and third interfaces. The first interface is configured to connect to a handset for receiving and transmitting analog signals to the handset. The second interface is configured to connect to a phone base for receiving signals from and transmitting analog signals to a telephone network. The third interface is configured to connect to a computer for receiving and transmitting digital signals to a data network. Alternatively, in accordance with another embodiment, the apparatus may be configured to connect between the phone base and the telephone network. In such an embodiment, the apparatus may be configured to accommodate and process both analog and digital phone signals.

In accordance with another embodiment, the invention pertains to a customer premises equipment (CPE) device. The CPE device includes a first interface configured to receive and transmit analog signals to a telephone network, and a second interface configured to receive and transmit digital signals to a data network. The device also includes a first user input mechanism to start a meeting over a data network, and a second user input mechanism to join a meeting over the data network.

In accordance with another embodiment, the invention pertains to an adaptor product configured to bridge a telephone network and a data network. The adaptor product includes means for transmitting a start meeting message over the data network to a data center and means for receiving a meeting identification from the data center into the adaptor product. The adaptor also includes means for transmitting the meeting identification from the adaptor product over the telephone network to a second adaptor product. Alternatively, in accordance with another embodiment, caller identification (caller 10 or CID) function may be utilized to facilitate launching or joining an online meeting.

In accordance with another embodiment, the adaptor device is configured to provide for the user to have phone calls by way of both the telephone network and the data network. Automatic phone answering and/or speed dialing may also be provided via the adaptor device and an application on the computer connected thereto. In accordance with another embodiment, the adaptor device is configured to provide for the user to use the phone as an audio input to the computer.

DETAILED DESCRIPTION

As discussed above, online meetings are typically initiated using web browsers and email. However, such initiation of meetings does not take advantage of the fact that people are very accustomed to making and receiving voice calls on their telephones. As described below, embodiments of the present invention take advantage of the ubiquity of and familiarity with telephone calls to facilitate the process of setting up online meetings over a data network.

Figure 1:
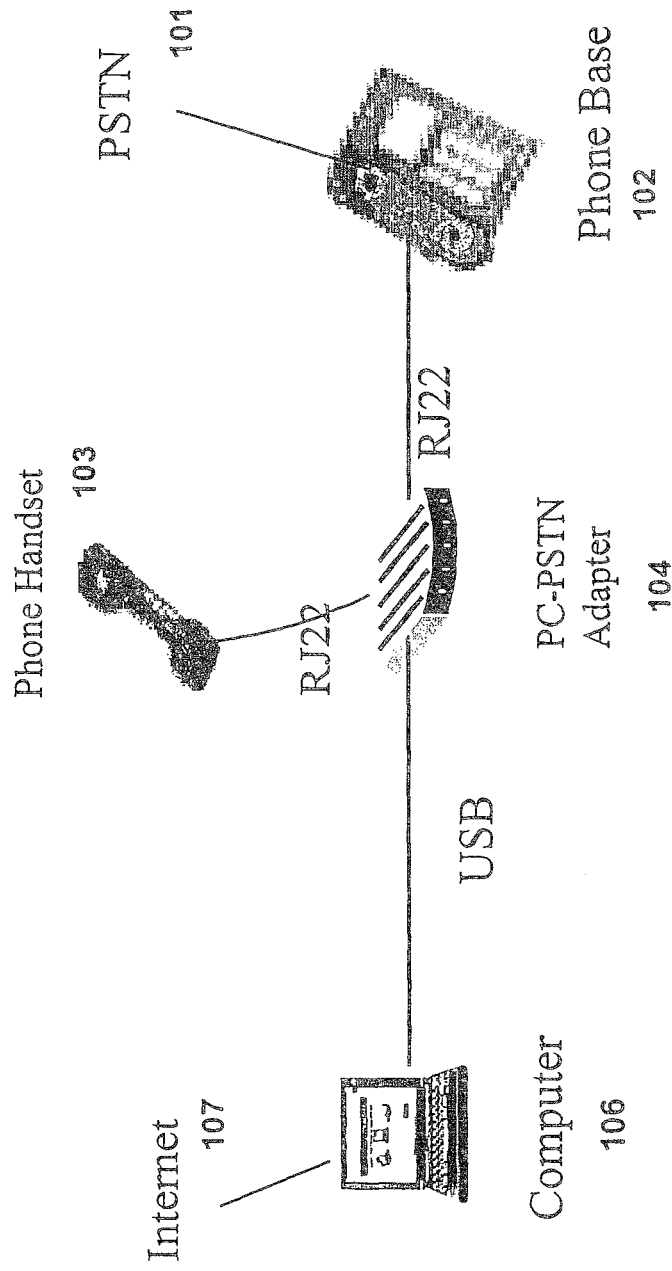
FIG. 1 depicts a configuration of devices including a PC-PSTN adapter in accordance with an embodiment of the invention.

FIG. 1 depicts a configuration of devices including a PC-PSTN adapter 104 in accordance with an embodiment of the invention. Broadly speaking, the PC-PSTN adapter 104 functions as a kind of bridge between the Internet (via the PC) and the public switched telephone network (PSTN).

In this embodiment, the PC-PSTN adapter 104 is connected between a telephone base 102 and a telephone handset 103. The connections may be via, for example, RJ 22, RJ 45, or other types of connectors depending on the telephone system. Alternatively, these connections may be wireless, for example, by way of a Bluetooth or similar type of interface for certain phones.

The adapter 104 is also connected to a computer 106. The connection to the computer 106 may be via a wired connection, such as, for example, a Universal Serial Bus (USB) connection or other type of wired connection. Alternatively, the connection to the computer may be wireless, for example, by way of IEEE 802.11 standards or other technologies.

The telephone base 102 may be either an analog phone or a digital phone. In other words, the connection from the phone base 102 to the PSTN 101 may be either analog or digital. Advantageously, connecting the PC-PSTN adapter 104 using the phone jacks between the phone base 102 and handset 103 enables the adapter 104 to be compatible with both analog and digital phones. This is because, while connections from phone base 102 to PSTN 101 may be either analog or digital, connections between phone base 102 and handset 103 are generally analog.

The computer 106 may comprise a personal computer (PC), whether a 5 desktop or laptop. The computer 106 includes a connection to the Internet 107 or, alternatively, to is a proprietary wide area network.

Figure 2:
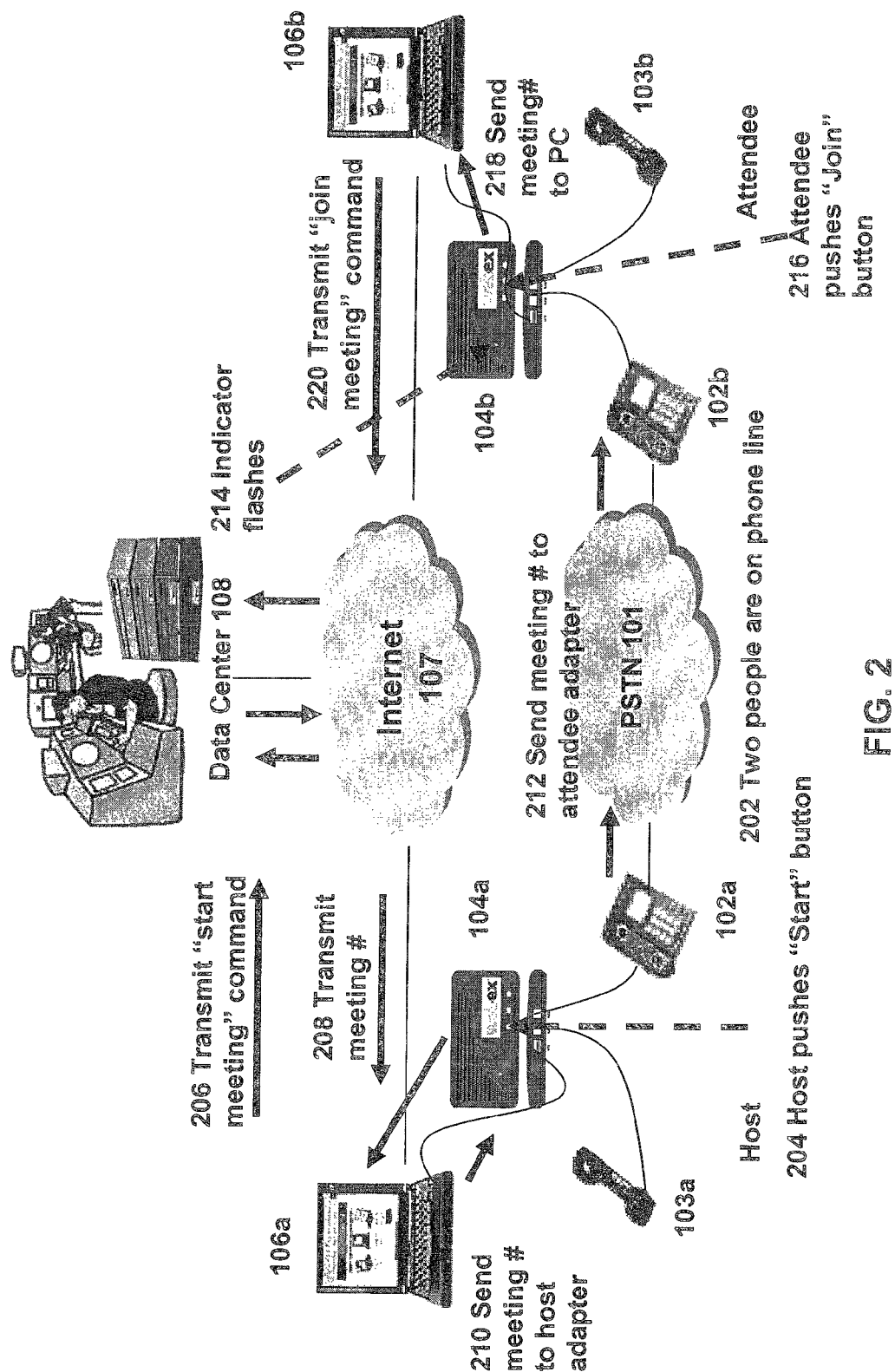
FIG. 2 is a diagram illustrating a method for starting a meeting over a data network in accordance with an embodiment of the invention.

FIG. 2 is a diagram illustrating a method for starting a meeting over a data network in accordance with an embodiment of the invention. Both the host and an attendee of the meeting have a configuration of equipment including a PC-PSTN adaptor 104.

At the beginning of the method, the host and the attendee are already on a phone line 202. In other words, the host's phone 102a is coupled to the attendee's phone 102b via the PSTN 101.

In this case, the host and attendee would like to start an online meeting between their computers 106a and 106b over a data network 107 in parallel to their phone conference over the telephone network 101. Such an online meeting may include data communication and/or videoconferencing. As one example, the online meeting may utilize WebEx® technology which integrates voice, data communications, and videoconferencing. WebEx® technology includes an interactive network with control over security and quality of service, a multimedia switching platform that provides real-time switching capabilities and can handle various types of digital content, and various interactive services including a meeting center service. In other examples, alternate technologies may be utilized for the online meeting over the data network. For instance, some of these technologies utilize a shared server to upload a presentation that others then view.

The host person gives a "start meeting" command 204 by way of a user input mechanism. For example, the user input mechanism may be pushing a "start" button on the PC-PSTN adaptor 104a, which functions here as a kind of bridge from the telephone network 101 to the data network 107. The start meeting command indicates that the host desires to begin an online meeting with the person on the other end of the phone line.

The start meeting command is sent to the host computer 106a, and the host computer 106a transmits the start meeting command 206 over the data network 107 to a data center 108. The data center 108 may comprise, for example, one such as the WebEx is data center of WebEx Communications, Inc. Of course, the invention is not limited to the WebEx data center. In other examples, other data centers may be utilized.

The data center 108 receives the start meeting command. The data center 108 generates a unique meeting number (or other form of meeting identification) to identify the online meeting being started and transmits 208 the meeting number back to the host computer 106a. The host computer 106a sends 210 the meeting number to the host adaptor 104a, which stores the meeting number in memory.

The host adaptor 104a now functions as a kind of bridge from the data network 107 back to the telephone network 101 by sending 212 the meeting number via the phone line to the attendee adaptor 104b. Prior to sending 212 the meeting number via the phone line, the meeting number is encoded by the host adaptor 104a into a form communicable over the telephone network 101. In one example, the meeting number may be converted into a dual tone multiple frequency (DTMF) signal. Other encoding techniques may also be used.

The attendee adaptor 104b receives the meeting number via the phone line. The meeting number may be received by the attendee adaptor 104b monitoring the phone connection to detect and decode an encoded meeting identification. For example, the attendee adaptor 104b may monitor the phone connection to detect and decode a DTMF signal.

In response to receiving the meeting number, the attendee adaptor 104b provides an indication 214 to the attendee that an online meeting with the host is available to join. The indication 214 may be, for example, a visual indication in the form of a flashing light emitting diode (LED) on the attendee adaptor 104b. Other forms of indication may be used instead or in addition, such as an audio indication.

If the attendee person wishes to join in an online meeting with the host, then, in response to the indication 214, the attendee gives a "join meeting" command 216 by way of a user input mechanism. The user input mechanism may be, for example, pushing a "join" button on the attendee adaptor 104b. The join meeting command indicates that the is attendee desires to join in an online meeting with the host.

The join meeting command along with the meeting identification number is sent 21S from the attendee adaptor 104b to the attendee computer 106b. The attendee computer 106b transmits 220 the join meeting command and the specific meeting number over the data network 107 to a data center 10S. The data center 10S then coordinates the online meeting between the host computer 106a and the attendee computer 106b.

An optional aspect of the method relates to recording audio of the online meeting. Either the host or the attendee (or both) may initiate an audio recording of the meeting by pressing a "record" button or other user input mechanism on their respective PC-PSTN adaptors 104. For example, the audio of the meeting may be recorded from the phone connection through one of the adaptors 104 to the computer 106 coupled to that adaptor 104. In another example, the audio of the meeting is recorded from the phone connection into flash memory in one of the adaptors 104. In one embodiment, such an audio recordation by an attendee would have to be authorized prior to being enabled. For example, a privilege-to-record field in the attendee adaptor 104b may have to be enabled prior to allowing the audio recordation of the meeting by way of the attendee adaptor 104b.

Figure 3:
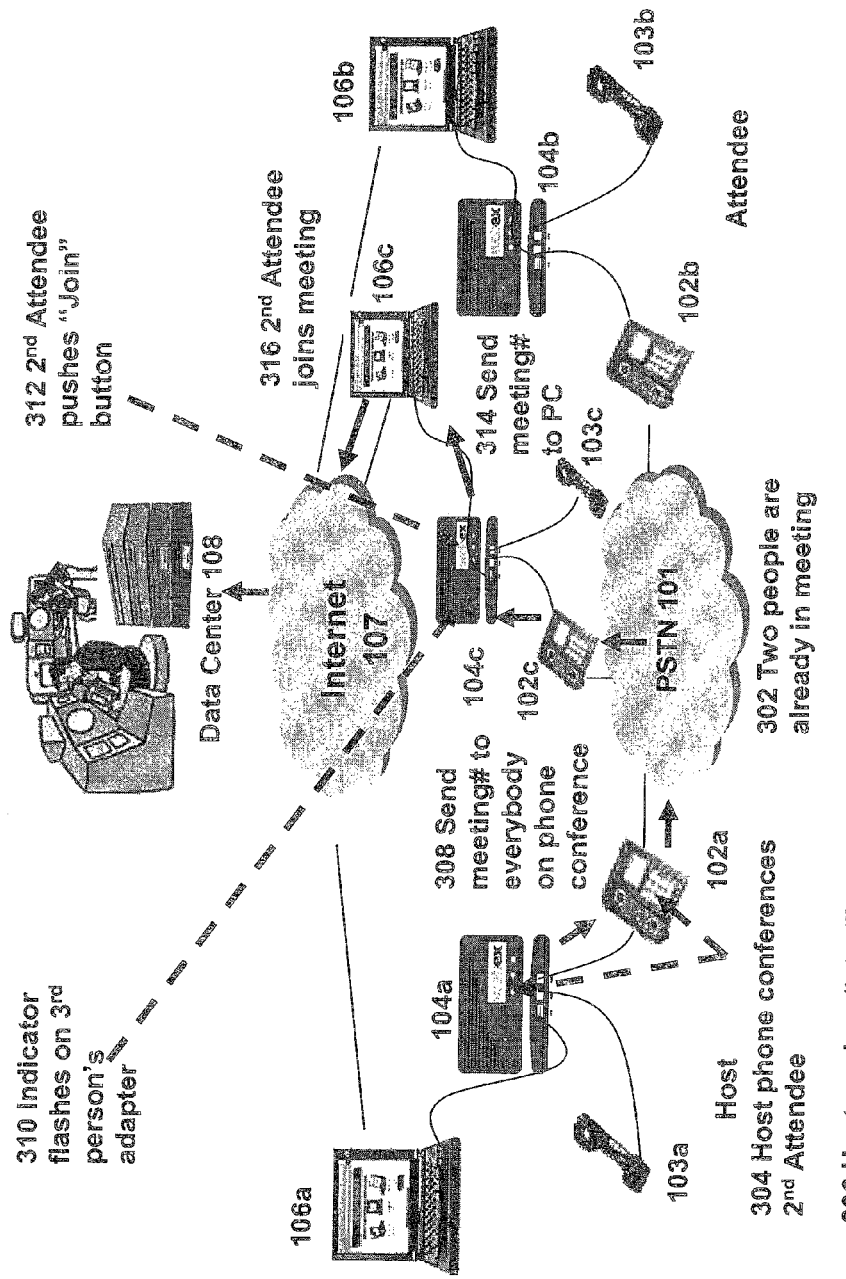
FIG. 3 is a diagram illustrating a method for joining a meeting over a data network in accordance with an embodiment of the invention.

FIG. 3 is a diagram illustrating a method for joining a meeting over a data network in accordance with an embodiment of the invention. The method of FIG. 3 is a continuation of the method of FIG. 2. Here, the host and first attendee are already joined in an online meeting 302.

Now, it is desired that a second attendee join into the meeting. The second attendee is teleconferenced 304 into the phone connection by the host, and then the host pushes the "start" button or provides similar user input 306. Upon receiving the "start meeting" user input from the host, the host adaptor 104a sends 30S the current meeting number to everyone on the phone conference. This is accomplished by encoding the meeting number and transmitting the encoded meeting number over the phone connection.

Since the first attendee adaptor 104b already has the current meeting number, it does not need to respond when it receives and decodes the meeting number over the phone line. The second attendee adaptor 104c also receives and decodes the meeting number sent by the host adaptor 104a. However, the meeting number is new to the second attendee adaptor 104c. As such, in response to receiving the meeting number, the second attendee adaptor 104c provides an indication 310 to the second attendee that there is an online meeting to join. As discussed above, the indication 310 may be, for example, a visual indication in the form of a flashing light emitting diode (LED) on the second attendee adaptor 104c.

If the second attendee person wishes to join in the online meeting, then, in response to the indication 310, the second attendee gives a "join meeting" command 312 by way of a user input mechanism. As discussed above, the user input mechanism may be, for example, pushing a "join" button on the second attendee adaptor 104c.

The join meeting command along with the meeting identification number is sent 314 from the second attendee adaptor 104c to the second attendee computer 106c. The second attendee computer 106c transmits 316 the join meeting command and the specific meeting number over the data network 107 to a data center 108. The data center 108 then coordinates the addition of the second attendee computer 106c to the ongoing online meeting.

Figure 4:
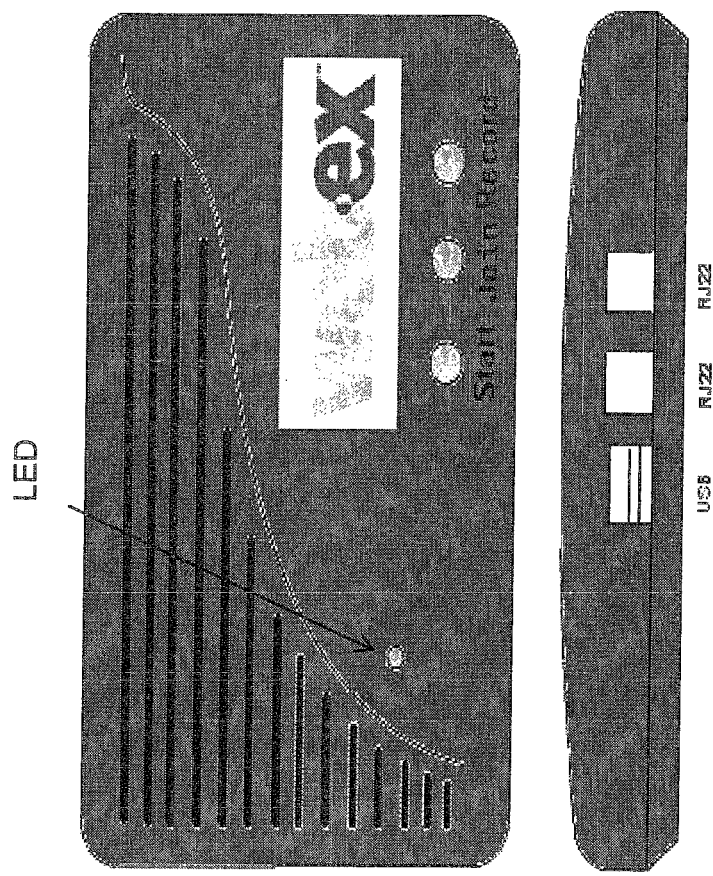
FIG. 4A is a top view of an example implementation of the PC-PSTN adapter in accordance with an embodiment of the invention.
FIG. 4B is a side view of the example implementation of the PC-PSTN adapter in accordance with an embodiment of the invention.

FIG. 4A is a top view and FIG. 4B is a side view of an example implementation of the PC-PSTN adapter 104 in accordance with an embodiment of the invention. As shown in the top view, the adaptor 104 may include an LED indicator and three buttons labeled "start", "join", and "record". As shown in the side view, the adaptor 104 may include three interface ports. Two of the ports may be RJ22 jacks, one to connect to a phone base 102, and the other to connect to a phone handset 103. The third port may be a USB connector to connect to a computer 106.

Figure 5:
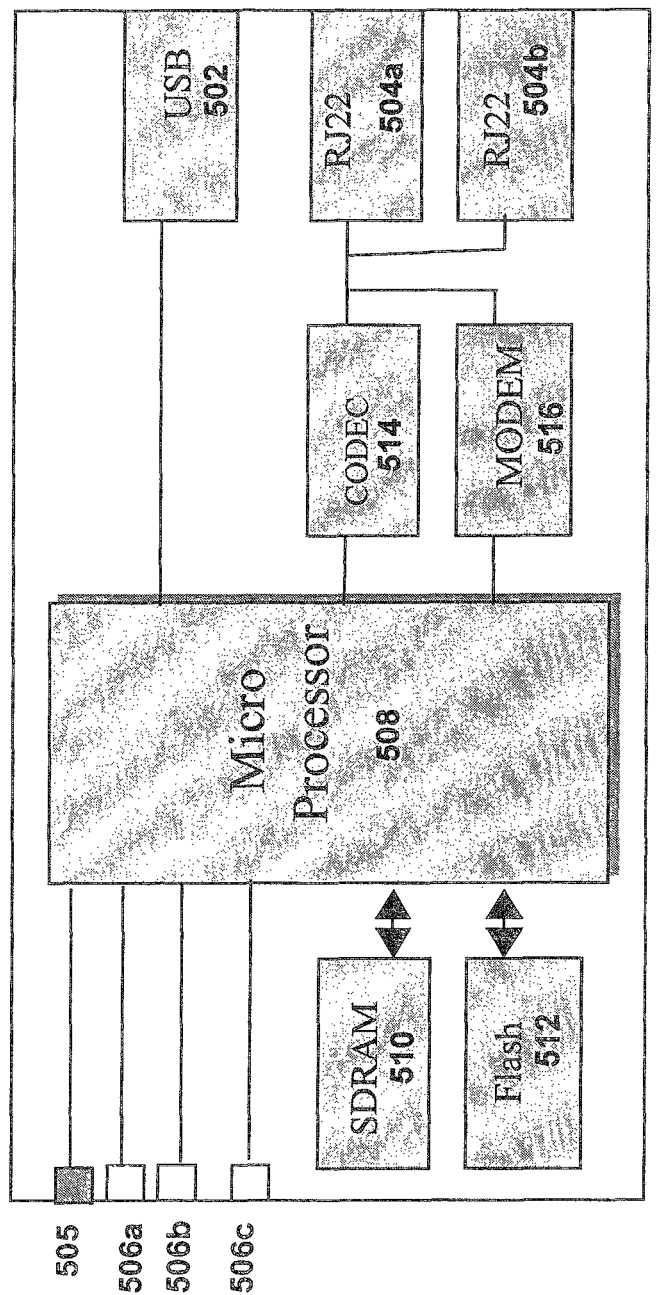
FIG. 5 is a schematic diagram of the example implementation of the PC-PSTN adapter in accordance with an embodiment of the invention.

FIG. 5 is a schematic diagram of the example implementation of the PC-PSTN is adapter 104 in accordance with an embodiment of the invention. The example adaptor 104 has various components including: a USB connector 502; two RJ22 jacks 504a and 504b; an LED indicator 505; three button 506a, 506b, and 506e; a microprocessor 508; SDRAM 510; flash memory 512; codec circuitry 514; and modem circuitry 516.

The adaptor 104 connects to the computer 106 by way of the USB connector 502, and connects to the phone handset and base by way of the two RJ22 jacks 504a and 504b. The LED 505 is used as an indicator mechanism by the adaptor 104, for example, to notify an attendee that there is an online meeting to join. The three buttons 506a, 506b, and 506e are user input mechanisms and may comprise, for example, the "start", "join", and "record" buttons shown in FIG. 4A.

The microprocessor 508 functions as the controller for the adaptor 104. The SDRAM (static dynamic random access memory) 510 is high-speed, volatile semiconductor memory utilized by the microprocessor 508 to store and retrieve data.

Similarly, the flash memory 512 is non-volatile memory utilized by the microprocessor 508 to store and retrieve data. The SDRAM 510 may be used for data that may be lost if power to the adaptor 104 is lost, while the flash memory 512 may be used for data that is to remain stored even if the power is lost.

The codec (encoding-decoding) circuitry 514 is utilized to transform analog voice signals into digital voice signals and vice-versa. The analog voice signals are received and transmitted over the telephone network 101, and the digital voice signals are communicated to the computer 106 and over the data network 107. For example, the codec circuitry 514 may include an ADC, a DAC, and a DSP. The ADC (analog-to-digital converter) is used to convert waveforms from analog to digital, and the DAC (digital-to-analog converter) is used to convert waveforms from digital to analog. The DSP (digital signal processor) is used to process signals in digital form. The DSP may include, for example, a voice-over-IP encoder-decoder (VoIP codec).

The modem (modulate-demodulate) circuitry 516 is used to modulate data onto an analog signal and also to demodulate data from an analog signal. For example, the modem circuitry 516 may comprise a DTMF (dual tone multiple frequency) modulator and demodulator.

In one embodiment, the codec circuitry 514 and flash memory 512 may be utilized to optionally record an audio signal captured by the telephone. For example, the audio signal may be the audio of a meeting. In another example, the audio signal may be a sound memo to be recorded to a file on the computer. The codec circuitry 514 would convert the analog voice signal to digital form, and the flash memory 512 would store the digital audio recording. Alternatively, such an audio recording may be stored at a computer 106.

In one embodiment, the codec circuitry 514 may be utilized to convert an audio message received in a digital format over the data line from the computer 106 to an analog format for playing over the phone line. For example, the audio message may be received from the data center 108. Such a message may, for instance, include instructions relating to starting, joining, or ending an online meeting, or be an audio signal received from another person received over the Internet. The message may be received via the computer 106 to the adaptor 104 and played to the recipient via the phone handset 103 (or phone speaker).

In one embodiment, power to operate the adaptor 104 may be received by way of the USB connection 502. Such an embodiment advantageously does not require power from the phone or a separate power connection, and further may be used with both analog and digital phones.

Figure 6:
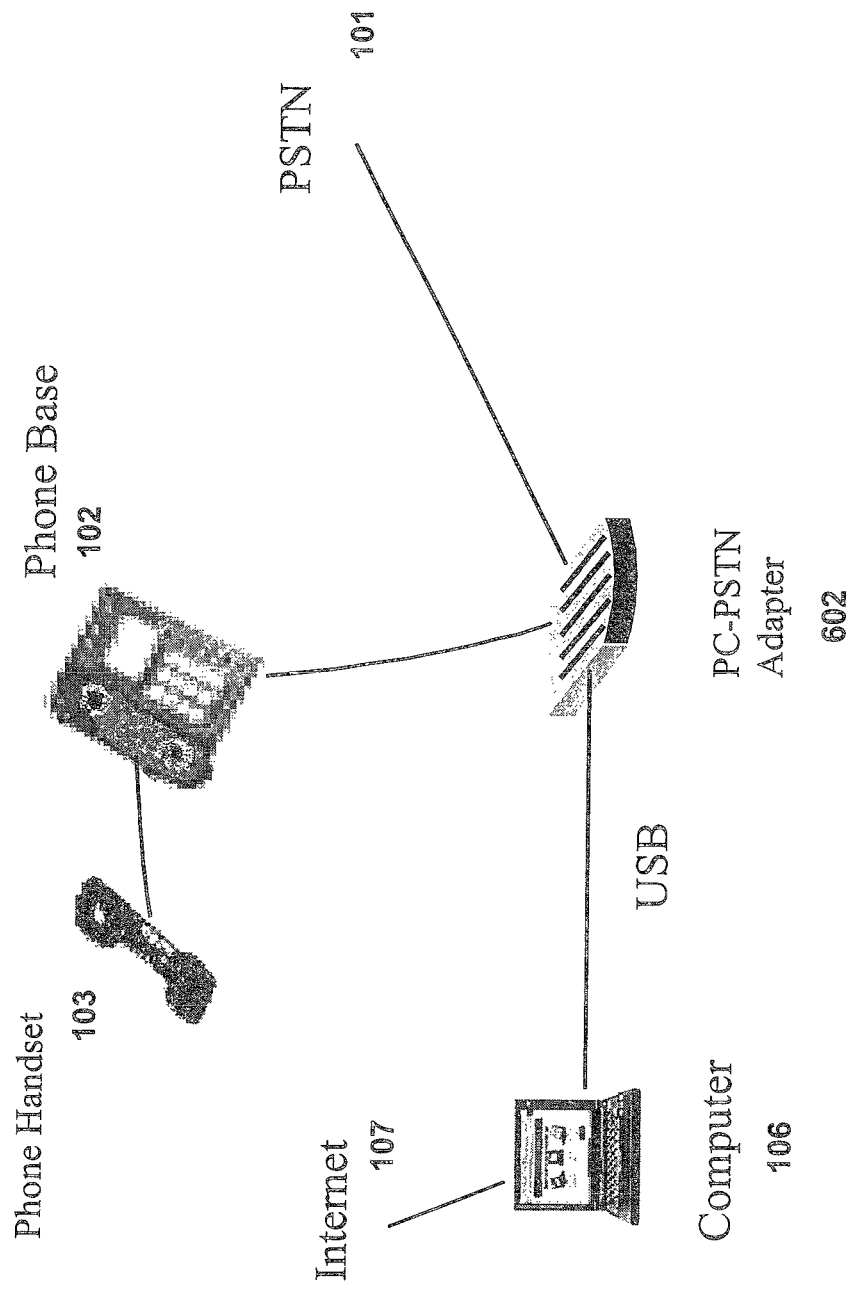
FIG. 6 depicts an alternate configuration of devices including a PCPSTN adapter in accordance with an embodiment of the invention.

FIG. 6 depicts an alternate configuration of devices including a PCPSTN adapter in accordance with an embodiment of the invention. Here, the PCPSTN Adaptor 104 is configured to accommodate and process both analog and digital phone signals. As such, the adaptor 104 may be connected between the phone base 102 and the PSTN 101. The adaptor 104 is also configured with a connection (for example, USB) to a computer 106 that may be interconnected with the Internet 107.

While one method for launching and joining a meeting is described above in is relation to FIGS. 2 and 3, the adaptor device 104 may be used to launch and/or join a meeting in different ways in accordance with other embodiments of the invention. For example, a caller ID (CID) function may be used. The adaptor device 104 attached to the attendee's phone may "see" the CID of the Host and provide that telephone number to the attendee's computer. The attendee's computer may in turn access a lookup table (for example, hosted at a data center) that associates the host's telephone number with a meeting number.

In accordance with another embodiment of the invention, the adaptor device 104 enables the phone to make and receive phone calls by way of the computer 106 and the Internet 107. The adaptor 104 may enable the same phone to make calls either via the PSTN 101 or the Internet 107. For example, a selection mechanism may be included on the adaptor 104 to select use of either the normal telephone call or a phone call over the Internet.

In accordance with another embodiment of the invention, the adaptor device 104 enables an application on the computer 107 to provide automatic phone answering functionality and/or speed dialing functionality. In the former case, the computer 107 is configured to answer the phone (by way of the adaptor 104) after a certain number of rings, provide an audio outgoing message, and record a message left by the caller. In the latter case, the computer 107 is configured to store phone numbers, and make calls (by way of the adaptor 104) using those phone numbers.

In accordance with another embodiment of the invention, the adaptor device 104 enables the phone handset 103 to be used as an audio input to the computer 107. An application on the computer 107 may capture the audio signal originating from the handset 103. For example, the audio signal may comprise an outgoing message used in an automatic phone answering system based on the computer 107, or the audio signal may comprise any other pre-recorded message to be played over the phone.

In the above description, numerous specific details are given to provide a is thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An adaptor comprising:
a first interface configured to connect to a telephone handset and configured to receive signals from, and transmit signals to, the telephone handset;
a second interface configured to connect to a telephone base and configured to receive signals from, and transmit signals to, a telephone network via the telephone base;
a third interface configured to connect to a computer and to receive signals from, and transmit signals to, a data network via the computer;
a user input mechanism configured to receive a start meeting command from a user of the telephone handset and computer; and
a microprocessor configured to, in response to a start meeting command being received on the user input mechanism, initiate an online meeting between the user of the telephone handset and computer, and one or more other users accessible over the telephone network and the data network, by transmission of a start meeting command, via the computer over the data network, receipt of a meeting identification, via the computer from the data network, and transmission of the received meeting identification, via the telephone base to the telephone network.

2. The adaptor of claim 1, further comprising:
a memory configured to store the received meeting identification.

3. The adaptor of claim 1, further comprising:
a second user input mechanism configured to receive a record command from the user to initiate recording of the online meeting.

4. The adaptor of claim 1, further comprising:
a third user input mechanism configured to receive a join meeting command from the user to initiate joining an ongoing online meeting.

5. The adaptor of claim 1 wherein the signals received from, and the signals transmitted to, the telephone handset are analog signals, the signals received from, and the signals transmitted to, the telephone network, via the telephone base, are analog signals, and the signals received from, and the signals transmitted to, the data network, via the computer, are digital signals.

6. The adaptor of claim 1, wherein at least one of the first interface and the second interface comprise a RJ22 or a RJ45 jack.

7. The adaptor of claim 1, wherein the third interface comprises a Universal Serial Bus (USB) connector.

8. The adaptor of claim 1, wherein at least one of the first interface, the second interface, and the third interface comprises a wireless interface.

9. The adaptor of claim 1, wherein the user input mechanism is a button disposed on the adaptor.

10. The adaptor of claim 1, wherein the telephone network is a public switched telephone network (PSTN).

11. An adaptor comprising:
a first interface configured to connect to a telephone network and configured to receive signals from, and transmit signals to, the telephone network;
a second interface configured to connect to a computer and to receive signals from, and transmit signals to, a data network via the computer;
a user input mechanism configured to receive a start meeting command from a user of the computer; and
a microprocessor configured to, in response to a start meeting command being received on the user input mechanism, initiate an online meeting between the user of the computer, and one or more other users, by transmission of a start meeting command, via the computer over the data network, receipt of a meeting identification, via the computer from the data network, and transmission of the received meeting identification to the telephone network.

12. The adaptor of claim 11, further comprising:
a third interface configured to connect to a telephone base and configured to receive signals from, and transmit signals to, the telephone base.

13. The adaptor of claim 11, further comprising:
a memory configured to store the received meeting identification.

14. The adaptor of claim 11, further comprising:
a second user input mechanism configured to receive a record command from the user to initiate recording of the online meeting.

15. The adaptor of claim 11, further comprising:
a third user input mechanism configured to receive a join meeting command from the user to initiate joining an ongoing online meeting.

16. An adaptor comprising:
means for connecting to a telephone network to receive signals from, and transmit signals to, the telephone network;
means for connecting to a computer to receive signals from, and transmit signals to, a data network, via the computer;
means for receiving a start meeting command from a user; and
means for initiating an online meeting between the user and one or more other users accessible over the telephone network and data network, in response to a start meeting command being received on the user input mechanism from the user, by transmission of a start meeting command, via the computer over the data network, receipt of a meeting identification, via the computer from the data network, and transmission of the received meeting identification, via the telephone base to the telephone network.

17. The adaptor of claim 16, wherein the means for connecting to a telephone network comprise means for connecting to a telephone base to receive signals from, and transmit signals to, the telephone base.

18. The adaptor of claim 16, further comprising:
means for connecting to a telephone handset to receive signals from, and transmit signals to, the telephone handset.

19. The adaptor of claim 11, wherein at least one of the first interface, the second interface, and the third interface comprises a wireless interface.

20. The adaptor of claim 16, further comprising means for receiving a record meeting command from the user to initiate recording of the online meeting.

* * * * *